(12) United States Patent
Ohkubo et al.

(10) Patent No.: US 7,708,354 B2
(45) Date of Patent: May 4, 2010

(54) BRAKE CONTROL APPARATUS AND CONTROL METHOD THEREOF

(75) Inventors: Masayasu Ohkubo, Okazaki (JP); Yasuji Mizutani, Susono (JP); Kazuyoshi Sakazaki, Tajimi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 803 days.

(21) Appl. No.: 11/552,621

(22) Filed: Oct. 25, 2006

(65) Prior Publication Data

US 2007/0114842 A1    May 24, 2007

(30) Foreign Application Priority Data

Nov. 18, 2005    (JP)    ............................. 2005-334537

(51) Int. Cl.
*B60T 17/04*    (2006.01)
(52) U.S. Cl. ..................................... 303/87; 303/119.2
(58) Field of Classification Search .................. 303/87, 303/119.1, 119.2, 122, 122.09, 122.11, 122.13, 303/122.1, 122.14, 152, DIG. 11
See application file for complete search history.

(56) References Cited

U.S. PATENT DOCUMENTS 5,788,337 A    8/1998    Eckert
6,280,006 B1 *    8/2001    Kobayashi et al. .......... 303/139

2004/0183371 A1    9/2004    Zheng et al.

FOREIGN PATENT DOCUMENTS

| EP | 0 864 477 A2 | 9/1998 |
|---|---|---|
| JP | 5-301567 | 11/1993 |
| JP | 11-59376 | 3/1999 |
| JP | 11-255101 | 9/1999 |
| JP | 2000-159094 | 6/2000 |
| JP | 2001-171503 | 6/2001 |
| JP | 2001-322539 | 11/2001 |
| JP | 2002-316631 | 10/2002 |
| WO | WO 2005/063539 A1 | 7/2005 |

* cited by examiner

*Primary Examiner*—Pam Rodriguez
(74) *Attorney, Agent, or Firm*—Oblon, Spivak, McClelland, Maier & Neustadt, L.L.P.

(57) ABSTRACT

The invention provides a brake control apparatus that improves the controllability of a vehicle in the control for restraining slip of the wheels. The brake control apparatus includes: wheel cylinders that apply braking force individually to wheels by supplying a working fluid; retention valves that are provided respectively upstream of the wheel cylinders and that are opened and closed so as to restrain slip of the wheels; a common control valve provided upstream of the retention valves to supply the working fluid to the wheel cylinders; and a control portion that controls the common control valve by different control laws to restrain fluctuations in pressure on a primary side of the retention valves caused by fluctuations in a capacity to which the working fluid from the common control valve is supplied, by opening or closing of the retention valves.

16 Claims, 4 Drawing Sheets

BRAKE CONTROL APPARATUS AND CONTROL METHOD THEREOF

INCORPORATION BY REFERENCE

The disclosure of Japanese Patent Application No. 2005-334537 filed on Nov. 18, 2005 including the specification, drawings and abstract is incorporated herein by reference in its entirety.

BACKGROUND OF THE INVENTION

1. Field of the Invention

The invention relates to a brake control apparatus that controls the braking force applied to a wheel provided in a vehicle, and a control method thereof.

2. Description of the Related Art

An antiskid brake apparatus in which the control gain at a pressure intensifying stage of a control cycle accomplished by an antiskid control means for controlling the slip rate of wheels is changed in accordance with the magnitude of brake hydraulic pressure that is generated corresponding to the brake pedal operation is described in Japanese Patent Application Publication No. JP-A-05-301567. In the described antiskid brake apparatus, the pressure intensifying control gain changes in accordance with the brake hydraulic pressure, that is, the hydraulic pressure on the primary side of an open-close valve provided for an antiskid control. Therefore, the apparatus effectively prevents a wheel from locking, and enhances the controllability associated with the antiskid control.

However, in the above-described antiskid brake apparatus, hydraulic pressure on the primary side fluctuates depending on not only the brake operation, but also the opening and closing of the antiskid control valve. The fluctuation in the primary side of the antiskid control valve hydraulic pressure associated with the opening and closing of the antiskid control valve contributes to the degradation of the controllability of the antiskid control.

SUMMARY OF THE INVENTION

The invention provides a brake control apparatus that improves the controllability in performing a control for restraining the slip of wheels, such as a so-called ABS control or the like, and a control method thereof.

A first aspect of the invention relates to a brake control apparatus. A brake control apparatus includes: wheel cylinders that apply braking force to individual wheels by supplying a working fluid; retention valves that are provided respectively upstream of the wheel cylinders and that open and close to restrain slip of the wheels; a common control valve, provided upstream of the retention valves, that supplies the working fluid to the wheel cylinders; and a control portion that controls the control valve by different control laws so as to minimize fluctuations in the pressure on the primary side of the retention valves caused by fluctuations in a capacity to which the working fluid from the common control valve is supplied, by the opening or closing of the retention valves.

According to this aspect, a common control valve is provided upstream of a plurality of retention valves, and the retention valves are provided respectively upstream of a plurality of wheel cylinders. Therefore, the working fluid is supplied from the common control valve to the plurality of wheel cylinders via the plurality of retention valves. The retention valves are actuated so that slip of the wheels is restrained. However, the actuation of the retention valves changes the capacity to which the working fluid is supplied from the common control valve. The control portion controls the command value for the control law of the common control valve so that fluctuations in the primary-side pressure of the retention valves caused by the aforementioned fluctuation in the object capacity is restrained. This makes it possible to improve the controllability of the wheel cylinder pressure when the retention valves are actuated to restrain slip of the wheels.

The control portion may increase a command value for the common control valve when the capacity increases, and the control portion may decrease the command value for the common control valve when the capacity decreases. According to this arrangement, the command for the common control valve increases or decreases in correlation with the capacity. Hence, the fluctuation in the primary-side pressure of the retention valves, which can result from the opening/closing of the retention valves, is minimized; thus, improving the controllability of the wheel cylinder pressure.

Furthermore, the control portion may control the common control valve by a feedback control law. The control portion may increase the control gain of the feedback control law when the capacity increases, and the control portion may decrease the control gain of the feedback control law when the capacity decreases. According to this arrangement, the common control valve is controlled by the feedback control law, and the control gain of the feedback control law increases or decreases in accordance with the increase or decrease in the capacity. Therefore, the command value for the common control valve can be increased or decreased in accordance with the actuation of the retention valves, so that the fluctuation in the primary-side pressure of the retention valves can be minimized.

Furthermore, the control portion may control the common control valve by using a feedforward control law as well as the feedback control law so that the command value for the common control valve increases when the capacity increases due to a fluctuation in the open/closed states actuation of the plurality of retention valves. With this arrangement, even when the capacity discontinuously increases due to a fluctuation in the open/closed states actuation of the retention values, for example, an increase in the number of open valves of the retention valves, it is possible to minimize the decline of the primary-side hydraulic pressure of the retention valves. As a result, the responsiveness of the wheel cylinder pressure is improved.

Furthermore, the control portion may control the common control valve by switching control law from the feedback control law to the feedforward control law so that the command value for the common control valve increases when the capacity increases due to a fluctuation in the open/closed states actuation of the retention valves.

Furthermore, the brake control apparatus may further include an accumulator in which the working fluid to be delivered to the common control valve is stored, wherein if an accumulator pressure has not reached a predetermined value when the capacity increases, the control portion may raise the accumulator pressure to or above the predetermined value. With this arrangement, the upstream pressure of the common control valve is increased to or above the predetermined value, so that the responsiveness of the pressure intensification of the wheel cylinder pressure can be further enhanced.

The common control valve may be constituted by a pressure intensifying linear control valve paired with a pressure reducing linear control valve, and controls the supply of working fluid to and discharge of working fluid from the wheel cylinders.

The pressure intensifying linear control valve may be a valve that is provided on a channel connecting the wheel cylinders and a power hydraulic pressure source that is able to deliver working fluid pressurized by supplying with drive power independently of an amount of operation of a brake operating member and which intensifies the working fluid pressure of the wheel cylinders. Furthermore, the pressure reducing linear control valve may be a valve that is provided on a channel connecting a channel downstream of the pressure intensifying linear control valve and a main channel connecting channels upstream of the plurality of wheel cylinders, and reduces the working fluid pressure intensified by the pressure intensifying linear control valve by discharging the working fluid supplied to the wheel cylinders to a manual hydraulic pressure source, which pressurizes the working fluid in accordance with the amount of operation of the brake operating member.

The brake control apparatus may further include a pump that raises the accumulator pressure.

Furthermore, the control portion may set the command value for the common control valve based on the open/closed states actuation of the plurality of retention valves.

Furthermore, the control portion may set the command value for the control valve so that the command value is proportional to the capacity to which the working fluid from the control valve is supplied.

A second aspect of the invention relates to a brake control method. This brake control method includes: (a) the step of determining whether there is a fluctuation in open/closed states actuation of a plurality of retention valves provided for restraining slip of a plurality of wheels; and (b) the step of controlling a common control valve, which is provided on a channel of a working fluid upstream of the plurality of retention valves and which supplies the working fluid to a plurality of wheel cylinders that apply braking force individually to the wheels, so that the fluctuation in pressure on a primary side of the plurality of retention valves is minimized if it is determined that there is the fluctuation in the open/closed states actuation of the plurality of retention valves.

The invention improves the controllability of the vehicle when a control for restraining slip of the wheels is performed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, best modes for carrying out the invention will be described in detail with reference to the drawings.

Figure 1:
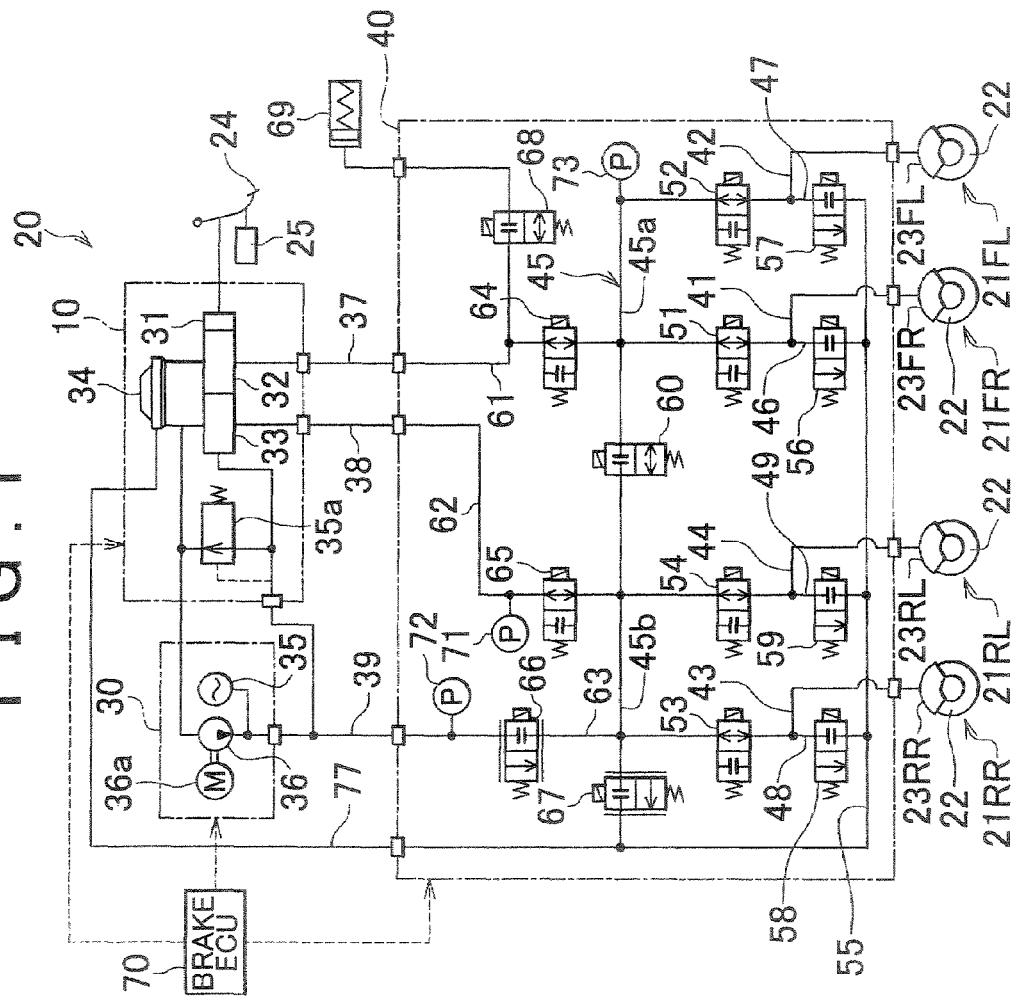
FIG. 1 is a system diagram showing a brake control apparatus in accordance with a first embodiment of the invention.

FIG. 1 is a system diagram showing a brake control apparatus 20 in accordance with a first embodiment of the invention. The brake control apparatus 20 constitutes a vehicular electronic control brake system (ECB), and controls the braking forces applied to the four wheels provided on the vehicle. The brake control apparatus 20, in accordance with this embodiment, may be installed in, for example, a hybrid vehicle equipped with an electric motor and an internal combustion engine as power sources for driving the vehicles. In such a hybrid vehicle, there are two modes of braking the vehicle. In particular, a regenerative braking mode, in which the vehicle is braked by regenerating kinetic energy of the vehicle into electric energy, and a hydraulic pressure braking mode, which is carried out by the brake control apparatus 20, can be used for the braking of the vehicle. The vehicle in this embodiment can execute a brake regeneration cooperative control of generating desired braking force through the combined use of the regenerative braking and the hydraulic pressure braking.

As shown in FIG. 1, the brake control apparatus 20 includes disc brake units 21FR, 21FL, 21RR and 21RL as braking force application mechanisms that are provided for the individual wheels (not shown), a master cylinder unit 10, a power hydraulic pressure source 30, and a hydraulic pressure actuator 40.

The disc brake units 21FR, 21FL, 21RR and 21RL apply braking force to the right front wheel, the left front wheel, the right rear wheel and the left rear wheel of the vehicle, respectively. The master cylinder unit 10 as a manual hydraulic pressure source, delivers brake fluid, pressurized in accordance with the amount of operation of a brake pedal 24, to the disc brake units 21FR to 21RL. The power hydraulic pressure source 30 is able to deliver the brake fluid as a working fluid, pressurized due to the supply of power, to the disc brake units 21FR to 21RL independently of the driver's operation of the brake pedal 24. The hydraulic pressure actuator 40 appropriately adjusts the hydraulic pressure of the brake fluid supplied from the power hydraulic pressure source 30 or the master cylinder unit 10, and delivers it to the disc brake units 21FR to 21RL. Thus, the braking force on each wheel provided by the hydraulic pressure braking is adjusted.

The disc brake units 21FR to 21RL, the master cylinder unit 10, the power hydraulic pressure source 30, and the hydraulic pressure actuator 40 will be individually described in detail below. Each disc brake unit 21FR to 21RL includes a brake rotor 22, and a corresponding wheel cylinder 23FR to 23RL that is contained in a brake caliper. The wheel cylinders 23FR to 23RL are respectively connected to the hydraulic pressure actuator 40 via different fluid passageways. Hereinafter, the wheel cylinders 23FR to 23RL will be collectively referred to as "wheel cylinders 23", where appropriate.

In each disc brake unit 21FR to 21RL, when brake fluid is supplied from the hydraulic pressure actuator 40 to the wheel cylinder 23, a brake pad as a friction member is pressed against the brake rotor 22 that rotates together with a corresponding wheel. Thus, braking force is applied to each wheel. Although this embodiment uses the disc brake units 21FR to 21RL, it is also permissible to use other braking force applying mechanisms which each include a wheel cylinder 23 that is, for example, a drum brake or the like.

The master cylinder unit 10 in this embodiment is equipped with a hydraulic pressure booster, and includes a hydraulic pressure booster 31, a master cylinder 32, a regulator 33, and a reservoir 34. The hydraulic pressure booster 31 is linked to the brake pedal 24, and amplifies the pedal depressing force applied to the brake pedal 24, and transfers it to the master cylinder 32. The pedal depressing force is amplified as the brake fluid is supplied from the power hydraulic pressure source 30 to the hydraulic pressure booster 31 via the regulator 33. Then, the master cylinder 32 generates a master cylinder pressure that has a predetermined servo ratio with respect to the pedal depressing force.

The reservoir 34 that retains brake fluid is disposed on top of the master cylinder 32 and the regulator 33. The master cylinder 32 is communicably connected with the reservoir 34 when the brake pedal 24 is not depressed. On the other hand, the regulator 33 is communicably connected with both the reservoir 34 and an accumulator 35 of the power hydraulic pressure source 30. Using the reservoir 34 as a low-pressure source and the accumulator 35 as a high-pressure source, the regulator 33 generates a hydraulic pressure substantially equal to the master cylinder pressure. The hydraulic pressure of the regulator 33 will be referred to as "regulator pressure" below, where appropriate.

The power hydraulic pressure source 30 includes the accumulator 35 and a pump 36. The accumulator 35 converts the pressure energy of the brake fluid pressurized by the pump 36 into the pressure energy of a filler gas, such as nitrogen or the like, for example, of about 14 to 22 MPa, and stores the converted pressure. The pump 36 has a motor 36a as a drive source. A suction opening of the pump 36 is connected to the reservoir 34 while the ejection opening thereof is connected to the accumulator 35. The accumulator 35 is also connected to a relief valve 35a that is provided in the master cylinder unit 10. If the pressure of the brake fluid in the accumulator 35 abnormally rises to, for example, about 25 MPa, the relief valve 35a opens, so that the high-pressure brake fluid returns to the reservoir 34.

As described above, the brake control apparatus 20 has the master cylinder 32, the regulator 33 and the accumulator 35 as sources of supplying brake fluid to the wheel cylinders 23. A master piping 37 is connected to the master cylinder 32. Likewise, a regulator piping 38 is connected to the regulator 33, and an accumulator piping 39 is connected to the accumulator 35. The master piping 37, the regulator piping 38 and the accumulator piping 39 are connected to the hydraulic pressure actuator 40.

The hydraulic pressure actuator 40 includes an actuator block in which a plurality of channels are formed, and a plurality of electromagnetic control valves. The channels formed in the actuator block include individual channels 41, 42, 43 and 44, and a main channel 45. The individual channels 41 to 44 branch from the main channel 45, and are connected to the wheel cylinders 23FR, 23FL, 23RR, 23RL of the disc brake units 21FR, 21FL, 21RR, 21RL, respectively. Thus, each wheel cylinder 23 is communicably connected with the main channel 45.

An intermediate portion of each of the individual channels 41, 42, 43 and 44 is provided with an ABS retention valve 51, 52, 53 and 54. Each of the ABS retention valves 51 to 54 has an on/off solenoid, and a spring, and is a normally open type electromagnetic control valve that is open when the solenoid is in a non-electrified state. When an ABS retention valve 51 to 54 is open, the brake fluid may pass in both directions. That is, the brake fluid can be caused to flow from the main channel 45 to the wheel cylinders 23, and can also be caused to flow from the wheel cylinders 23 to the main channel 45. When an ABS retention valve 51 to 54 is closed, by electrifying the solenoid thereof, the passage of brake fluid in a corresponding one of the individual channels 41 to 44 is interrupted.

Furthermore, the wheel cylinders 23 are connected to a reservoir channel 55 via pressure reducing channels 46, 47, 48 and 49 that are connected to the individual channels 41 to 44, respectively. An intermediate portion of each of the pressure reducing channels 46, 47, 48 and 49 is provided with an ABS pressure-reducing valve 56, 57, 58 and 59. Each of the ABS pressure-reducing valves 56 to 59 has an on/off solenoid, and a spring, and is a normally closed type electromagnetic valve that is closed while the solenoid is in a non-electrified state. When an ABS pressure-reducing valve 56 to 59 is closed, the passage of brake fluid through a corresponding one of the pressure reducing channels 46 to 49 is interrupted. When the ABS pressure reducing valve 56 to 59 is opened by electrifying the solenoid thereof, the passage of brake fluid through the corresponding one of the pressure reducing channels 46 to 49 is permitted, so that the brake fluid returns from the corresponding one of the wheel cylinders 23 to the reservoir 34 via the one of the pressure reducing channels 46 to 49 and the reservoir channel 55. Incidentally, the reservoir channel 55 is connected to the reservoir 34 of the master cylinder unit 10 via a reservoir piping 77.

An intermediate portion of the main channel 45 has a separation valve 60. The separation valve 60 divides the main channel 45 into a first channel 45a, connected to the individual channels 41 and 42, and a second channel 45b, connected to the individual channels 43 and 44. The first channel 45a is connected to the front wheel cylinders 23FR and 23FL via the individual channels 41 and 42. The second channel 45b is connected to the rear wheel cylinders 23RR and 23RL via the individual channels 43 and 44.

The separation valve 60 has an on/off solenoid, and a spring, and is a normally closed type electromagnetic control valve that is closed when the solenoid is in a non-electrified state. When the separation valve 60 is closed, the passage of brake fluid in the main channel 45 is interrupted. When the separation valve 60 is opened, by electrifying the solenoid thereof, brake fluid can be passed in both directions between the first channel 45a and the second channel 45b.

In the hydraulic pressure actuator 40, a master channel 61 and a regulator channel 62 communicably connected with the main channel 45 are formed. More specifically, the master channel 61 is connected to the first channel 45a of the main channel 45, and the regulator channel 62 is connected to the second channel 45b of the main channel 45. Furthermore, the master channel 61 is connected to the master piping 37 that is communicably connected with the master cylinder 32. The regulator channel 62 is connected to the regulator piping 38 that is communicably connected with the regulator 33.

An intermediate portion of the master channel 61 has a master cut valve 64. The master cut valve 64 has an on/off solenoid, and a spring, and is a normally open type electromagnetic control valve that is open when the solenoid is in the non-electrified state. When the master cut valve 64 is open, brake fluid is allowed to pass in both directions between the master cylinder 32 and the first channel 45a of the main channel 45. When the master cut valve 64 is closed, by electrifying the solenoid, the passage of brake fluid in the master channel 61 is interrupted.

A stroke simulator 69 is connected to the master channel 61 on the upstream side of the master cut valve 64, via a simulator cut valve 68. That is, the simulator cut valve 68 is provided in a channel that connects the master cylinder 32 and the stroke simulator 69. The simulator cut valve 68 has an on/off solenoid and a spring, and is normally closed type electromagnetic control valve that is closed when the solenoid is in the non-electrified state. When the simulator cut valve 68 is closed, the passage of brake fluid between the master channel 61 and the stroke simulator 69 is interrupted. When the simulator cut valve 68 is opened, by electrifying the solenoid, the brake fluid can be passed in both directions between the master cylinder 32 and the stroke simulator 69.

The stroke simulator 69 includes pistons and springs, and delivers reaction force that is in accordance with the driver's depression force on the brake pedal 24 when the simulator cut valve 68 is open. The stroke simulator 69 may have a multi-stepped spring characteristic for improving the driver's brake operation feeling.

An intermediate portion of the regulator channel 62 has a regulator cut valve 65. The regulator cut valve 65 also has an on/off solenoid, and a spring, and is a normally open type electromagnetic control valve that is open when the solenoid is in the non-electrified state. When the regulator cut valve 65 is open, it allows brake fluid to pass in both directions between the regulator 33 and the second channel 45b of the main channel 45. When the regulator cut valve 65 is closed, by electrifying the solenoid, the passage of brake fluid in the regulator channel 62 is interrupted.

In this embodiment, as described above, the master cylinder 32 of the master cylinder unit 10 is communicably connected with the front wheel-cylinders 23FR and 23FL, by a first system that includes the following elements: the master piping 37, the master channel 61, the master cut valve 64, the first channel 45a of the main channel 45, the individual channels 41 and 42, and the ABS retention valves 51 and 52. The hydraulic pressure booster 31 and the regulator 33 of the master cylinder unit 10 are communicably connected with the rear wheel-cylinders 23RR and 23RL, by a second system that includes the following elements: the master piping 38, the regulator channel 62, the regulator cut valve 65, the second channel 45b of the main channel 45, the individual channels 43 and 44, and the ABS retention valves 53 and 54.

Therefore, the hydraulic pressure in the master cylinder unit 10 pressurized in accordance with the amount of brake operation performed by the driver is transferred to the front wheel-cylinders 23FR and 23FL via the first system. The hydraulic pressure in the master cylinder unit 10 is also transferred to the rear wheel-cylinders 23RR and 23RL via the second system. Thus, the braking force in accordance with the amount of brake operation of the driver can be generated on the individual wheel cylinders 23.

In the hydraulic pressure actuator 40, an accumulator channel 63 is also formed in addition to the master channel 61 and the regulator channel 62. One end of the accumulator channel 63 is connected to the second channel 45b of the main channel 45, and the other end thereof is connected to the accumulator piping 39 that is communicably connected with the accumulator 35.

An intermediate portion of the accumulator channel 63 has a pressure intensifying linear control valve 66. Furthermore, the accumulator channel 63, and the second channel 45b of the main channel 45 are connected to the reservoir channel 55 via a pressure reducing linear control valve 67. Each of the pressure intensifying linear control valve 66 and the pressure reducing linear control valve 67 has a linear solenoid, and a spring, and is a normally closed type electromagnetic control valve that is closed when the solenoid thereof is in the non-electrified state. In each of the pressure intensifying linear control valve 66 and the pressure reducing linear control valve 67, the valve opening degree is adjusted in proportion to the electric current supplied to the solenoid thereof.

The pressure intensifying linear control valve 66 is provided as a common pressuring intensifying control valve for the plurality of wheel cylinders 23 that are provided corresponding to the wheels. Likewise, the pressure reducing linear control valve 67 is provided as a common pressure reducing control valve for the wheel cylinders 23. That is, in this embodiment, the pressure intensifying linear control valve 66 and the pressure reducing linear control valve 67 are provided as a pair of common control valves for the wheel cylinders 23 that control the supply and discharge of the working fluid delivered from the power hydraulic pressure source 30, with respect to the wheel cylinders 23. The provision of the pressure intensifying linear control valve 66 and the like for shared use for the wheel cylinders 23 as described above will curb the cost in comparison with a construction in which a linear control valve is provided each individual wheel cylinder 23.

The differential pressure between the output and input openings of the pressure intensifying linear control valve 66 corresponds to the pressure difference between the pressure of brake fluid in the accumulator 35 and the pressure of brake fluid in the main channel 45. The differential pressure between the output and input openings of the pressure reducing linear control valve 67 corresponds to the pressure difference between the pressure of brake fluid in the main channel 45 and the pressure of brake fluid in the reservoir 34. Furthermore, a relationship of $F1+F3=F2$ holds where $F1$ is the electromagnetic drive force that is in accordance with the electric power supplied to the linear solenoid of the pressure intensifying linear control valve 66 or the pressure reducing linear control valve 67, $F2$ is the elastic force of the spring thereof, and $F3$ is a differential pressure action force that is in accordance with the differential pressure between the output and input openings of the pressure intensifying linear control valve 66 or the pressure reducing linear control valve 67. Therefore, by continuously controlling the electric powers supplied to the linear solenoids of the pressure intensifying linear control valve 66 and the pressure reducing linear control valve 67, the differential pressures between the output and input openings of the pressure intensifying linear control valve 66 and the pressure reducing linear control valve 67 can be controlled.

In the brake control apparatus 20, the power hydraulic pressure source 30 and the hydraulic pressure actuator 40 are controlled by a brake ECU 70 that is provided as a control portion in this embodiment. The brake ECU 70 is constructed as a microprocessor that includes a CPU. Besides the CPU, the brake ECU 70 further has a ROM that stores various programs, a RAM for temporarily storing data, input/output ports, communication ports, etc. The brake ECU 70 communicates with a hybrid ECU (not shown) that is superior thereto, and the like. On the basis of control signals from the hybrid ECU and signals from various sensors, the brake ECU 70 executes the brake regeneration cooperative control by controlling the pump 36 of the power hydraulic pressure source 30, and the electromagnetic control valves 51 to 54, 56 to 59, 60, 64 to 68 that constitute the hydraulic pressure actuator 40.

A regulator pressure sensor 71, an accumulator pressure sensor 72 and a control pressure sensor 73 are connected to the brake ECU 70. The regulator pressure sensor 71 detects the pressure of brake fluid in the regulator channel 62 on the upstream side of the regulator cut valve 65, that is, the regulator pressure, and gives a signal indicating the detected value, to the brake ECU 70. The accumulator pressure sensor 72 detects the pressure of brake fluid in the accumulator channel 63 on the upstream side of the pressure intensifying linear control valve 66, that is, the accumulator pressure, and gives a signal indicating the detected value, to the brake ECU 70. The control pressure sensor 73 detects the pressure of brake fluid in the first channel 45a of the main channel 45, and gives a signal indicating the detected value, to the brake ECU 70. The detected value of the pressure sensors 71 to 73 are sequentially given to the brake ECU 70 at predetermined intervals, and are stored and retained in predetermined storage areas in the brake ECU 70, in a predetermined amount at a time. Incidentally, in this embodiment, the pressure sensors 71 to 73 have a self-diagnostic function. That is, each of the sensors is able to detect the presence/absence of an abnormality within the sensor, and to transmit a signal indicating the presence/absence of an abnormality to the brake ECU 70.

In the case where the separation valve 60 is open and the first channel 45a and the second channel 45b of the main channel 45 are communicably connected with each other, the output value of the control pressure sensor 73 indicates the hydraulic pressure on the low-pressure side of the pressure intensifying linear control valve 66, and also indicates the hydraulic pressure on the high-pressure side of the pressure reducing linear control valve 67. Therefore, the output value thereof can be used to control the pressure intensifying linear control valve 66 and the pressure reducing linear control valve 67. In the case where the pressure intensifying linear control valve 66 and the pressure reducing linear control valve 67 are closed and where the master cut valve 64 is in the open state, the output value of the control pressure sensor 73 indicates the master cylinder pressure. Furthermore, in the case where the separation valve 60 is open so that the first channel 45a and the second channel 45b of the main channel 45 are communicably connected with each other and where the ABS retention valves 51 to 54 are open while the ABS pressure reducing valves 56 to 59 are closed, the output value of the control pressure sensor 73 indicates the working fluid pressure that acts on each wheel cylinder 23, that is, the wheel cylinder pressure.

Furthermore, the sensors connected to the brake ECU 70 also include a stroke sensor 25 that is provided for the brake pedal 24. The stroke sensor 25 detects the pedal stroke as the amount of operation of the brake pedal 24, and gives a signal indicating the detected value, to the brake ECU 70. The output value of the stroke sensor 25 is also sequentially given to the brake ECU 70 at predetermined time intervals, and is stored and retained in a predetermined area in the brake ECU 70 in a predetermined amount at a time. A brake operation state detection means other than the stroke sensor 25 may also be provided and connected to the brake ECU 70, in addition to the stroke sensor 25 or in place of the stroke sensor 25. Examples of the brake operation state detection means include a pedal depression force sensor that detects the operation force on the brake pedal 24, a brake switch that detects that the brake pedal 24 has been depressed, etc.

The brake control apparatus 20 constructed as described above executes the brake regeneration cooperative control. Upon receiving a braking request, the brake control apparatus 20 starts braking. The braking request is generated when braking force needs to be applied to the vehicle. The braking request is generated in cases, for example, where a driver operates the brake pedal 24, or where while the vehicle is running and an automatic control of the distance between the vehicle and another vehicle is being executed, the distance to the another vehicle goes below a threshold distance, or the like.

Receiving the braking request, the brake ECU 70 calculates a requested hydraulic pressure braking force that is a braking force to be generated by the brake control apparatus 20, by subtracting the braking force produced by the regeneration, from the requested total braking force. The value of the braking force produced by the regeneration is supplied from the hybrid ECU to the brake control apparatus 20. Then, on the basis of the requested hydraulic pressure braking force calculated as described above, the brake ECU 70 calculates a target hydraulic pressure for the wheel cylinders 23. The brake ECU 70 determines the value of current supplied to the pressure intensifying linear control valve 66 and pressure reducing linear control valve 67 in accordance with a feedback control law so that the wheel cylinder pressure becomes equal to the target hydraulic pressure.

As a result, in the brake control apparatus 20, brake fluid is supplied from the power hydraulic pressure source 30 to the individual wheel cylinders 23 via the pressure intensifying linear control valve 66, so that braking force is applied to the wheels. Brake fluid is discharged from the wheel cylinders 23 via the pressure reducing linear control valve 67 in accordance with need so as to adjust the braking force applied to the wheels. At this time, the brake ECU 70 causes the regulator cut valve 65 to be in the closed state, so that the brake fluid delivered from the regulator 33 is not supplied to the main channel 45. Furthermore, the brake ECU 70 causes the master cut valve 64 to be in the closed state, and the simulator cut valve 68 to be in the open state. This operation is performed so that the brake fluid delivered from the master cylinder 32 in association with the operation of the brake pedal 24 performed by the driver will be supplied to the stroke simulator 69.

Furthermore, the brake control apparatus 20 is able to execute controls for restraining slip of each wheel on the road surface, which are generally termed "ABS (antilock brake system) control", "VSC (vehicle stability control) control", and "TRC (traction control) control". The ABS control is a control for restraining lock-up of the tires that would otherwise be likely to occur at hard braking or on slippery road surfaces. The VSC control is a control for restraining skid of the wheels during the turning of the vehicle. The TRC control is a control for restraining the spinning of the drive wheels during takeoff or acceleration of the vehicle. When the aforementioned ABS control or the like is performed, the brake regeneration cooperative control is not executed, and the requested braking force is covered by the hydraulic pressure braking force that the brake control apparatus 20 generates. In the following description, these controls for restraining slip of the wheels will be collectively referred to as "ABS control or the like" below, where appropriate.

The brake ECU 70 performs computations and the like that are needed to execute the ABS control or the like. The brake ECU 70 opens or closes the ABS retention valves 51 to 54 and the ABS pressure reducing valves 56 to 59 by a predetermined ratio calculated by a known method on the basis of the vehicle deceleration, the slip rate, etc. By opening the ABS retention valves 51 to 54, the wheel cylinders 23 are supplied with the brake fluid adjusted in pressure by the pressure intensifying linear control valve 66 and the pressure reducing linear control valve 67 that are common control valves provided upstream of the ABS retention valves 51 to 54. Furthermore, by opening the ABS pressure reducing valves 56 to 59, the brake fluid in the wheel cylinders 23 is discharged to the reservoir 34. Thus, the brake fluid is supplied to and discharged from the wheel cylinders 23 so that the braking force applied to the individual wheels is controlled to restrain slip of the wheels.

Hereinafter, for the sake of convenience, the capacity of the wheel cylinders 23, the main channel 45, etc., to which the working fluid from the pressure intensifying linear control valve 66 is supplied, that is, the capacity into which the working fluid delivered from the pressure intensifying linear control valve 66 can flow, will be referred to as "consumed oil amount" below, where appropriate. Furthermore, the number of those of the ABS retention valves 51 to 54 that are in the open state will be termed the number of open valves of the ABS retention valves 51 to 54, where appropriate.

During execution of a control for restraining slip of the wheels, such as the ABS control or the like, the consumed oil amount fluctuates in accordance with the open/closed states of the ABS retention valves 51 to 54. For example, if the number of open valves of the ABS retention valves 51 to 54 increases, the consumed oil amount increases. Conversely, if the number of open valves of the ABS retention valves 51 to 54 decreases, the consumed oil amount decreases. If under such a situation, the pressure intensifying linear control valve 66 is controlled by a certain control law, fluctuations in the consumed oil amount associated with the opening/closing of the ABS retention valves 51 to 54 may sometimes cause fluctuations in the primary-side hydraulic pressure of the ABS retention valves 51 to 54. When the ABS control or the like is executed, it may be that the primary-side hydraulic pressure of the ABS retention valves 51 to 54 be held at a constant level. Incidentally, the primary-side hydraulic pressure of the ABS retention valves 51 to 54 herein is the hydraulic pressure upstream of the ABS retention valves 51 to 54 and downstream of the pressure intensifying linear control valve 66, that is, the hydraulic pressure in the main channel 45.

Therefore, in this embodiment, the brake ECU 70 controls the pressure intensifying linear control valve 66 by changing the command value of the control law in accordance with the open/closed states of the ABS retention valves 51 to 54. Concretely, the brake ECU 70 increases the control gain of the feedback control law when the consumed oil amount increases due to the opening/closing of the ABS retention valves 51 to 54. The brake ECU 70 decreases the control gain when the consumed oil amount decreases. As a result, the control current supplied to the pressure intensifying linear control valve 66 is increased or decreased as the consumed oil amount increases or decreases by the opening/closing of the ABS retention valves 51 to 54.

Figure 2:
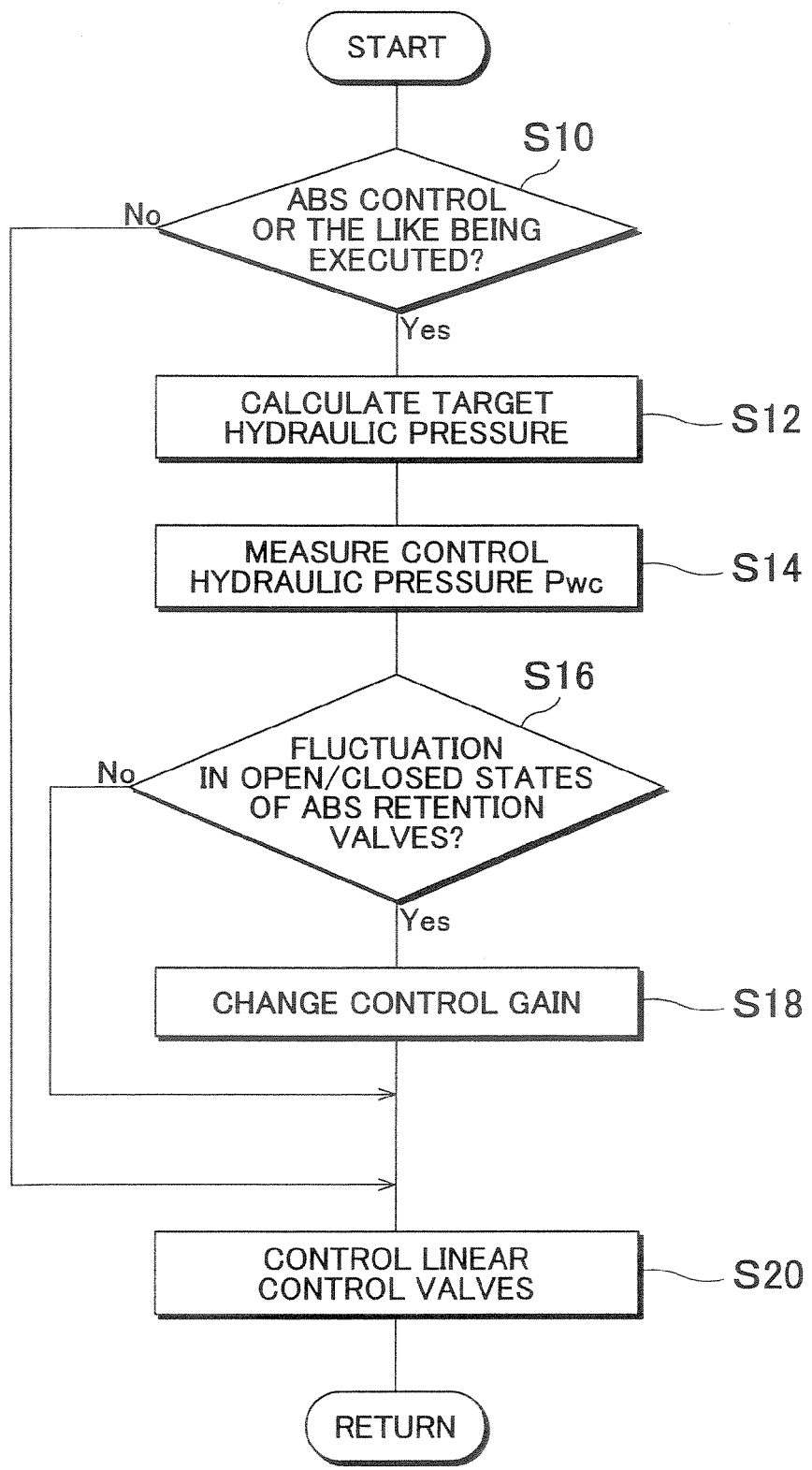
FIG. 2 is a flowchart for describing a process in the first embodiment.

With reference to FIG. 2, a process in the first embodiment will be described. FIG. 2 is a flowchart for describing a process in the first embodiment. The process shown in FIG. 2 is executed on a predetermined cycle when braking, for example, every several milliseconds.

As shown in FIG. 2, after the process starts upon generation of a braking request, the brake ECU 70 determines whether or not a control involving the opening/closing of the ABS retention valves 51 to 54 to restrain slip of the wheels, such as the ABS control, the VSC control, the TRC control or the like, is being executed. If it is determined that none of the aforementioned control is being executed (NO at S10), the brake ECU 70 controls the pressure intensifying linear control valve 66 and the pressure reducing linear control valve 67 (S20) to apply braking force to the wheels.

If it is determined that one of the ABS control and the like is being executed (YES at S10), the brake ECU 70 calculates a target value of the hydraulic pressure on the upstream side of the ABS retention valves 51 to 54, that is, a target value of the control hydraulic pressure Pwc in the main channel 45, which is on the secondary side of the pressure intensifying linear control valve 66 (S12). This target value is a target value of the control hydraulic pressure Pwc in the control for restraining slip of the wheel, such as the ABS control or the like. Subsequently, the brake ECU 70 measures the control hydraulic pressure Pwc via the control pressure sensor 73 (S14).

Then, the brake ECU 70 determines whether or not the open/closed states of the ABS retention valves 51 to 54 are fluctuating (S16). The brake ECU 70 stores the open/closed states detected in the previous cycle of the process, and determines whether or not the open/closed states of the ABS retention valves 51 to 54 have fluctuated by comparing the previous open/closed states and the present open/closed states. The brake ECU 70 determines that the open/closed states of the ABS retention valves 51 to 54 are fluctuating if there is a fluctuation in at least one set of the number of open valves of the front ABS retention valves 51, 52 and the number of open valves of the rear ABS retention valves 53, 54.

This is because in this embodiment, the capacity of the front wheel-cylinders 23FR, 23FL and the capacity of the rear wheel-cylinders 23RR, 23RL are different. For example, the capacity of the rear wheel-cylinders 23RR, 23RL is about half the capacity of the front wheel-cylinders 23FR, 23FL. As a result, for example, the consumed oil amount is different between the case where the front ABS retention valves 51, 52 are open and the case where the rear ABS retention valves 53, 54 are open, although the number of open valves is two in both cases.

If it is determined that the open/closed states of the ABS retention valves 51 to 54 are fluctuating (YES at S16), the brake ECU 70 changes the control gain of the feedback control law of the pressure intensifying linear control valve 66 in accordance with the open/closed states of the ABS retention valves 51 to 54 (S18). Furthermore, the control gain of the pressure reducing linear control valve 67 may be changed as the control gain of the pressure intensifying linear control valve 66 changes.

In this embodiment, during execution of the ABS control or the like, the brake ECU 70 controls the control hydraulic pressure Pwc through a PD (Proportional-Derivative) control. Therefore, the brake ECU 70 changes the values of the proportional gain and the derivative gain in accordance with the open/closed states of the ABS retention valves 51 to 54. Control gains are pre-set in accordance with the open/closed states of the ABS retention valves 51 to 54, and are stored in the brake ECU 70. If a PID (Proportional-Integral-Derivative) control is adopted instead of the PD control, it is appropriate to change the integral gain as well.

In this embodiment, different values of the control gain are set for the open/closed states mentioned below. The open/closed states include the case where all the ABS retention valves 51 to 54 are closed, the case where only one of the ABS retention valves 51 to 54 is open, the case where two of the ABS retention valves 51 to 54 are open, the case where three of the ABS retention valves 51 to 54 are open, and the case where all the ABS retention valves 51 to 54 are open.

More in detail, the case where only one of the ABS retention valves 51 to 54 is open is divided into two cases: the case where only one of the front ABS retention valves 51, 52 is open; and the case where only one of the rear ABS retention valves 53, 54. The case where two of the ABS retention valves 51 to 54 are open is divided into three cases: the case where both of the front ABS retention valves 51, 52 are open; the case where both of rear the ABS retention valves 53, 54 are open; and the case where one of the front ABS retention valves 51, 52 is open and one of rear the ABS retention valves 53, 54 is open. The case where three of the ABS retention valves 51 to 54 are open is divided into two cases: the case where both of the front ABS retention valves 51, 52 and one of the rear ABS retention valves 53, 54 are open; and the case where one of the front ABS retention valves 51, 52 and both of the rear ABS retention valves 53, 54 are open.

In the end, in this embodiment, different values of the control gain are pre-set individually for a total of nine open/closed states, and are stored in the brake ECU 70. A control gain can be determined taking into consideration the relationship between the wheel cylinders pressure and the consumed oil amount in each of the open/closed states. The value of the control gain may also be determined so as to be proportional to the consumed oil amount. In this case, the control gain may be determined through appropriate adjustment from the viewpoint of controllability and the like.

After the control gain is changed, the brake ECU 70 computes using the post-change control gain, the control current supplied to the pressure intensifying linear control valve 66 and the pressure reducing linear control valve 67. Then, the brake ECU 70 controls the two linear control valves 66, 67 so that the control hydraulic pressure Pwc approaches the target hydraulic pressure.

On the other hand, if it is determined that the open/closed states of the ABS retention valves 51 to 54 are not fluctuating (NO at S16), the brake ECU 70 computes the control current supplied to the pressure intensifying linear control valve 66 and the pressure reducing linear control valve 67 without changing the control gain, so as to control the two linear control valves.

As described above, according to the first embodiment, while the ABS control or the like is being executed, the control gain of the feedback control law is changed in accordance with the open/closed states of the ABS retention valves 51 to 54, and the pressure intensifying linear control valve 66 and the pressure reducing linear control valve 67 are accordingly controlled. Therefore, since fluctuations in the primary-side hydraulic pressure of the ABS retention valves 51 to 54 are restrained, the controllability of the wheel cylinder pressure in the ABS control or the like is improved.

The primary-side hydraulic pressure of the ABS retention valves 51 to 54 is also the primary-side hydraulic pressure of the pressure reducing linear control valve 67. Therefore, according to this embodiment, fluctuations in the primary-side hydraulic pressure of the pressure reducing linear control valve 67 are also restrained. This lessens the possibility of occurrence of an event where it is likely that the pressure reducing linear control valve 67 will be adversely affected due to excessively high pressure acting on the pressure reducing linear control valve 67, for example, the accumulator pressure directly acting on the pressure reducing linear control valve 67 with the pressure intensifying linear control valve 66 fully opened beyond expectation. As a result, it becomes possible to set the valve opening pressure on the pressure reducing linear control valve 67 at a relatively low level.

Although in the embodiment, the control gain is changed every time the open/closed states of the ABS retention valves 51 to 54 fluctuate, this does not limit the invention. A common control gain for a plurality of open/closed states may be set. For example, the brake ECU 70 may change the control gain if there is a fluctuation in the number of open valves of the ABS retention valves 51 to 54 without considering the distinction between the front wheel side and the rear wheel side. In this case, it is appropriate that the control gain be pre-set in accordance with the number of open valves of the ABS retention valves 51 to 54, and be stored in the brake ECU 70.

In particular, in the case where all the ABS retention valves 51 to 54 are closed, the consumed oil amount becomes about as small as the capacity of the channel that includes the main channel 45 and the like. In this case, the consumed oil amount becomes particularly small in comparison with the case where any one of the ABS retention valves 51 to 54 is open. Therefore, the brake ECU 70 may change the control gain between the two cases: the case where all the ABS retention valves 51 to 54 are closed; and the case where any one of the ABS retention valves 51 to 54 is open.

The brake ECU 70 may also expand the non-sensitive zone of the control hydraulic pressure Pwc in the case where all the ABS retention valves 51 to 54 are closed. This will reduce the frequency of controlling the pressure intensifying linear control valve 66 in the case where all the ABS retention valves 51 to 54 are closed, and therefore will restrain fluctuations in the control hydraulic pressure Pwc.

Next, a second embodiment will be described. The second embodiment differs from the first embodiment in that when the consumed oil amount increases due to the opening of the ABS retention valves 51 to 54, the pressure intensifying linear control valve 66 is controlled by using a feedforward control law as well. In the following description related to the second embodiment, descriptions of the same contents and the like as in the first embodiment will be avoided where appropriate.

Figure 3:
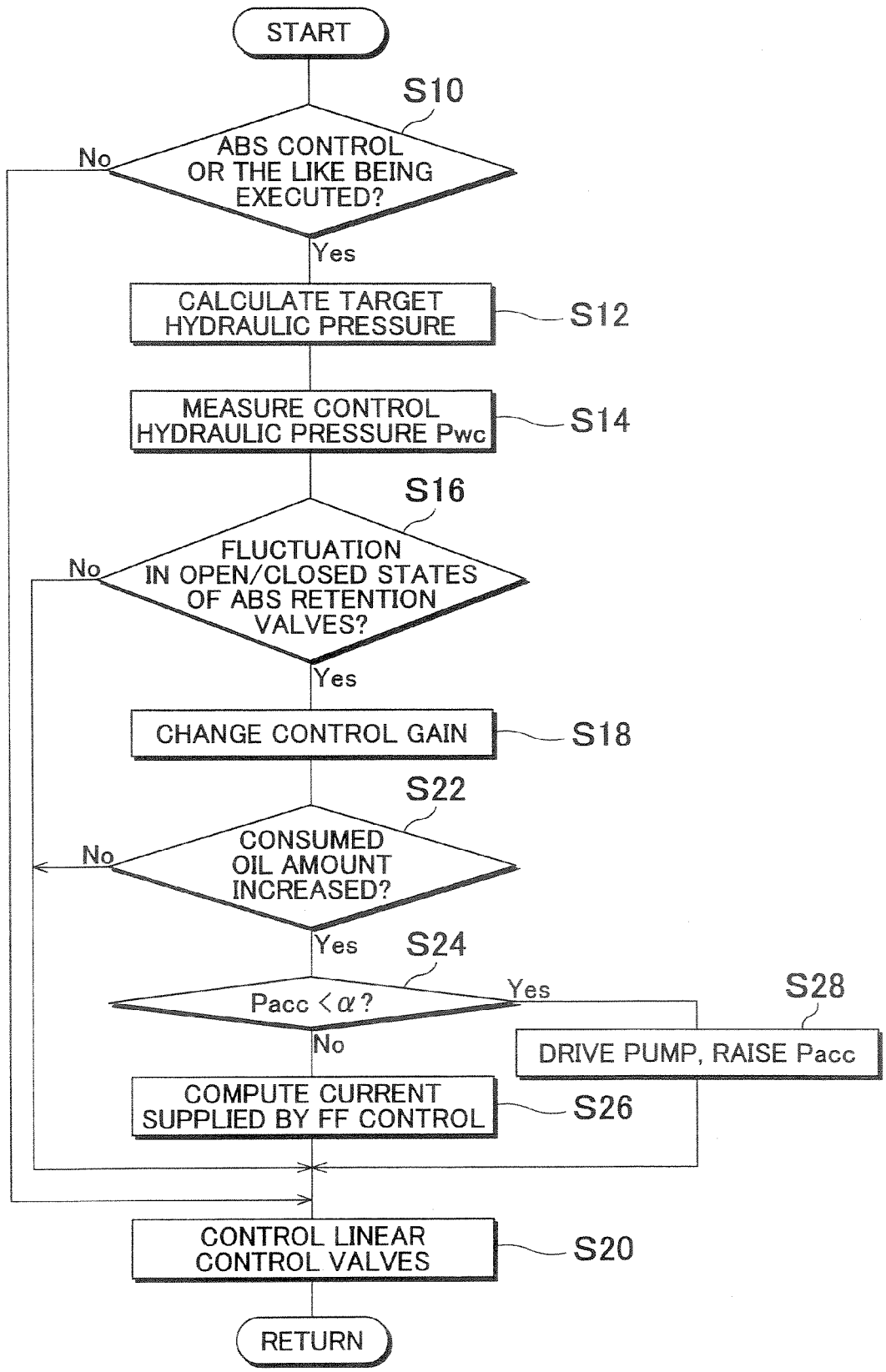
FIG. 3 is a flowchart for describing a process in a second embodiment.

FIG. 3 is a flowchart for describing a process in the second embodiment. The process shown in FIG. 3 is executed on a predetermined cycle, for example, every several milliseconds. The process from step S10 immediately following the start of the process of FIG. 3, at which it is determined whether or not the ABS control or the like is being executed, to step S18 at which the control gain of the feedback control law is changed is executed in the same manner as in the first embodiment.

After the control gain is changed, the brake ECU 70 determines whether or not the consumed oil amount has increased in association with fluctuations in the open/closed states of the ABS retention valves 51 to 54 (S22). The cases where the consumed oil amount increases include, for example, the case where the number of open valves of the ABS retention valves 51 to 54 increases, the case where the rear ABS retention valves 53, 54 are closed and the front ABS retention valves 51, 52 where the wheel cylinders 23 have a large capacity are opened, etc.

If it is determined that the consumed oil amount has increased (YES at S22), the brake ECU 70 determines whether or not the accumulator pressure Pacc has reached a predetermined pressure α (S24). During execution of the ABS control and the like, the accumulator pressure Pacc is controlled so as to be within a range of, for example, about 16.5 to 18.5 MPa. The predetermined pressure α is set at a value close to the upper limit of the range, for example, about 18.5 MPa.

If it is determined that the accumulator pressure Pacc is greater than or equal to the predetermined pressure α (NO at S24), the brake ECU 70 controls the pressure intensifying linear control valve 66 by using a feedforward control law as well as a feedback control law. To that end, the brake ECU 70 computes the current supplied to the pressure intensifying linear control valve 66 according to the feedforward control law (FF control) (S26). At this time, the brake ECU 70 computes the current supplied to the pressure intensifying linear control valve 66, on the basis of the relationship between the current supplied to the pressure intensifying linear control valve 66 and the valve flow amount thereof, and the consumed oil amount at the time point. It is also permissible that a feedforward control current in accordance with the open/closed states of the ABS retention valves 51 to 54 be pre-set, and be stored in the brake ECU 70.

Then, the brake ECU 70 superposes the control current based on the feedforward control law on the control current based on the feedback control law, and supplies the thus-obtained control current to the pressure intensifying linear control valve 66. As a result, the pressure intensifying linear control valve 66 is controlled so that the control hydraulic pressure Pwc approaches a target hydraulic pressure (S20).

On the other hand, if it is determined that the consumed oil amount has not increased (NO at S22), the brake ECU 70 controls the pressure intensifying linear control valve 66 by the feedback control law without using the feedforward control law (S20). Furthermore, if it is determined that the accumulator pressure Pacc has not reached predetermined pressure α (YES at S24), the brake ECU 70 starts raising the accumulator pressure Pacc to or above the predetermined pressure α by driving the pump 36 (S28). In this case, too, the brake ECU 70 controls the pressure intensifying linear control valve 66 by the feedback control law without using the feedforward control law (S20).

Figure 4:
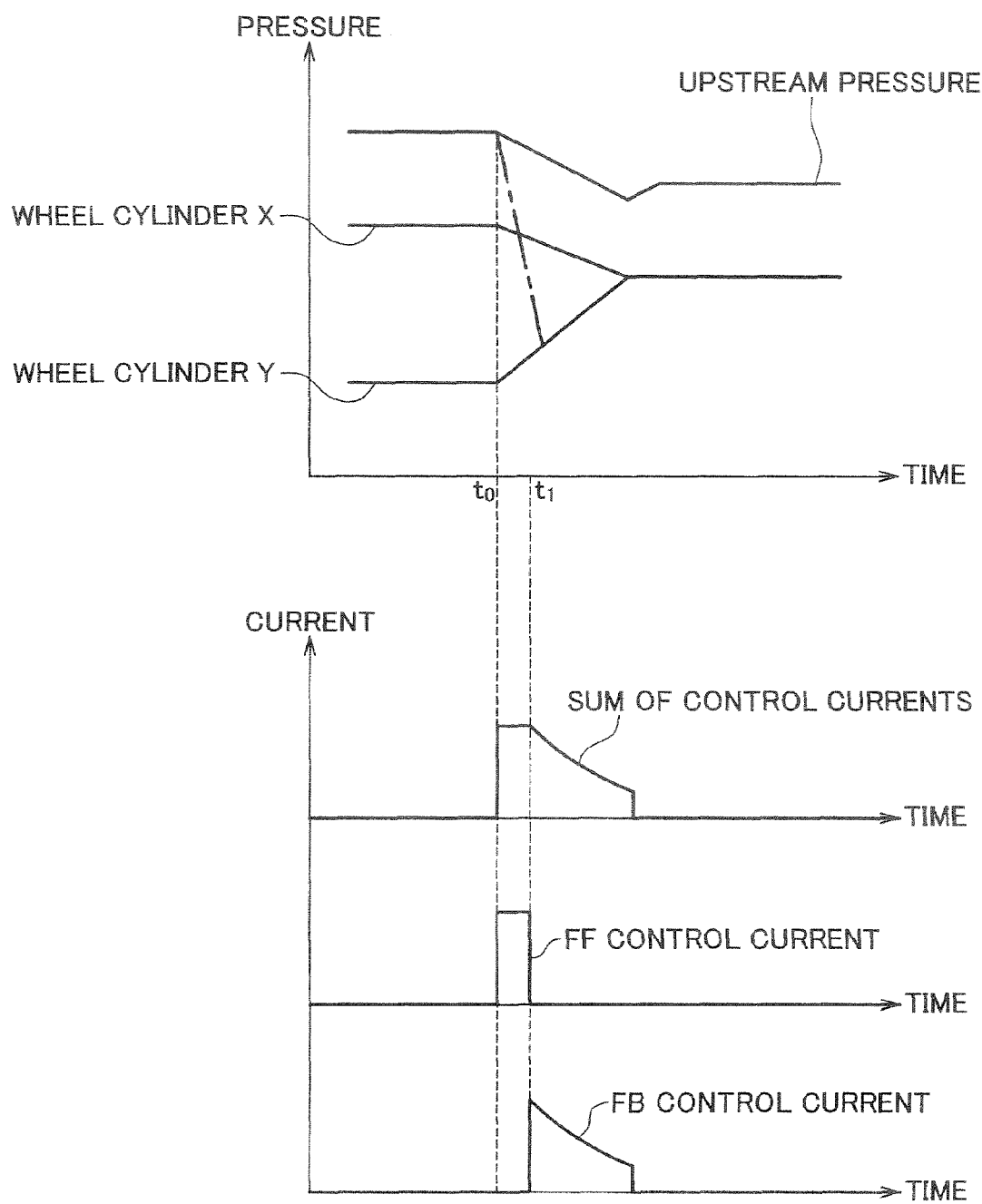
FIG. 4 is a graph schematically showing examples of histories of the hydraulic pressure and the control current in the second embodiment.

FIG. 4 is a graph schematically showing examples of transitions of the hydraulic pressure and the control current in the second embodiment. FIG. 4 shows the control current and the control hydraulic pressure in the case where the feedforward control law is used as well.

In the upper portion of FIG. 4, fluctuations in the primary side hydraulic pressure (upstream pressure) of the ABS retention valves 51 to 54, and fluctuations in pressure in a specific wheel cylinder X and a specific wheel cylinder Y are shown by solid lines. The vertical axis represents the pressure, and the horizontal axis represents time. In the lower portion of FIG. 4, the sum of the control currents supplied to the pressure intensifying linear control valve 66, the FF control current computed by the feedforward control law, and the FB control current computed by the feedback control law are shown sequentially from above. The pressure intensifying linear control valve 66 is controlled through the supply of the control current that is the sum of the FF control current and the FB control current.

In FIG. 4, during an initial period, only the ABS retention valve upstream of the wheel cylinder X is open, and at time t0, the ABS retention valve upstream of the wheel cylinder Y is also opened, so that the consumed oil amount increases. Then, the hydraulic pressure in the wheel cylinder X decreases slightly and the hydraulic pressure in the wheel cylinder Y increases, thus converging to a target hydraulic pressure. During the same period, the upstream pressure begins to decrease at time t0. After the hydraulic pressures of the wheel cylinders X and Y converge, the upstream pressure gradually converges to a certain value that is lower than the upstream pressure occurring before the increase in the consumed oil amount. This is because, as shown in the lower portion of FIG. 4, the FF control current begins to be supplied to the pressure intensifying linear control valve 66 at time t0 at which the consumed oil amount starts to increase. In this embodiment, the FF control current is supplied stepwise from time t0 to time t1.

On the other hand, when the control is performed by the feedback control law without the use of the feedforward control law, the upstream pressure may sometimes greatly decline as indicated by a one-dot chain line when the consumed oil amount increases. This is because the supply of the FB control current begins at time t1, with a slight delay from time t0. In the embodiment, the FB control current is supplied from time t1 until the wheel cylinder pressure reaches a target hydraulic pressure. Because the wheel cylinder pressure gradually approaches the target hydraulic pressure, the FB control current gradually decreases from time t1 on, and becomes zero when the wheel cylinder pressure reaches the target hydraulic pressure.

As described above, in the second embodiment, since the feedforward control law is used as well when the consumed oil amount increases, the control current can be supplied to the pressure intensifying linear control valve 66 immediately after the consumed oil amount increases. As a result, the decline of the upstream pressure of the ABS retention valves 51 to 54 can be minimized, and the responsiveness of the wheel cylinder pressure can be enhanced.

Furthermore, if the accumulator pressure Pacc has not reached the predetermined pressure α when the consumed oil amount increases, the accumulator pressure Pacc is raised so as to become equal to or higher than the predetermined pressure α. Therefore, the upstream pressure of the pressure intensifying linear control valve 66 is increased to further enhance the responsiveness of the wheel cylinder pressure.

In the second embodiment, the determination as to whether the accumulator pressure Pacc has reached the predetermined pressure α may also be omitted. Furthermore, the brake ECU 70 may control the pressure intensifying linear control valve 66 by switching the control law from the feedback control law to the feedforward control law when the consumed oil amount increases, instead of using the feedforward control law as well as the feedback control law when oil consumption increases.

What is claimed is:

1. A brake control apparatus comprising:
    a plurality of wheel cylinders that apply braking force individually to a plurality of wheels by supplying a working fluid;
    a plurality of retention valves that are provided on a channel of the working fluid upstream of the respective cylinder of the plurality of wheel cylinders and that are opened and closed to restrain slip of the wheels;
    a common control valve provided on the channel of the working fluid upstream of the plurality of retention valves to supply the working fluid to the plurality of wheel cylinders; and
    a control portion that controls the common control valve to restrain fluctuations in pressure on a primary side of the retention valves caused by fluctuations in a capacity to which the working fluid from the common control valve is supplied, by opening or closing of the plurality of retention valves.

2. The brake control apparatus according to claim 1, wherein the control portion increases a command value for the common control valve when the capacity increases, and the control portion decreases the command value for the common control valve when the capacity decreases.

3. The brake control apparatus according to claim 2, wherein the control portion sets the command value for the common control valve based on the open/closed states of actuation of the plurality of retention valves.

4. The brake control apparatus according to claim 2, wherein the control portion sets the command value for the common control valve so that the command value is proportional to the capacity to which the working fluid from the common control valve is supplied.

5. The brake control apparatus according to claim 1, wherein the control portion controls the common control valve by a feedback control law, and the control portion increases a control gain of the feedback control law when the capacity increases, and the control portion decreases the control gain of the feedback control law when the capacity decreases.

6. The brake control apparatus according to claim 5, wherein the control portion controls the common control valve by using a feedforward control law as well as the feedback control law so that the command value for the common control valve increases when the capacity increases due to a fluctuation in open/closed states of actuation of the plurality of retention valves.

7. The brake control apparatus according to claim 6, wherein the control portion controls the common control valve by switching control law from the feedback control law to the feedforward control law so that the command value for the common control valve increases when the capacity increases due to a fluctuation in the open/closed states actuation of the retention valves.

8. The brake control apparatus according to claim 1, further comprising: an accumulator in which the working fluid to be delivered to the common control valve is stored, wherein if an accumulator pressure has not reached a predetermined value when the capacity increases, the control portion raises the accumulator pressure to at least the predetermined value.

9. The brake control apparatus according to claim 1, wherein the common control valve is constituted by a pressure intensifying linear control valve paired with a pressure reducing linear control valve, and controls supply of the working fluid to and discharge of the working fluid from the wheel cylinders.

10. The brake control apparatus according to claim 9, wherein the pressure intensifying linear control valve is a valve which is provided on a channel connecting the wheel cylinders and a power hydraulic pressure source that is able to deliver working fluid pressurized by supplying with drive power independently of an amount of operation of a brake operating member, and which intensifies the working fluid pressure of the wheel cylinders, and the pressure reducing linear control valve is a valve which is provided on a channel connecting a channel downstream of the pressure intensifying linear control valve and a main channel connecting channels upstream of the plurality of wheel cylinders, and which reduces the working fluid pressure intensified by the pressure intensifying linear control valve, by discharging the working fluid supplied to the wheel cylinders, to a manual hydraulic pressure source that pressurizes the working fluid in accordance with the amount of operation of the brake operating member.

11. The brake control apparatus according to claim 8, further comprising: a pump that raises the accumulator pressure.

12. The brake control apparatus according to claim 1, wherein the control portion sets a command value for the common control valve based on an open/closed state of actuation of the plurality of retention valves so that the command value is proportional to the fluctuation in a capacity to which the working fluid from the common control valve is supplied to the plurality of retention valves.

13. The brake control apparatus according to claim 1, further comprising:
a manual hydraulic pressure source that pressurizes the working fluid in accordance with an amount of brake operation performed by a driver, and delivers the pressurized working fluid to the plurality of wheel cylinders; and
a power hydraulic pressure source which is provided in parallel with the manual hydraulic pressure source with respect to the plurality of wheel cylinders, and in which the working fluid is pressurized by supply of drive power, independently of the amount of the brake operation performed by the driver, and the pressurized working fluid is stored in an accumulator, wherein
the common control valve is provided between the accumulator and the plurality of retention valves, and the control portion controls the common control valve by a feedback control law, and the control portion increases a control gain of the feedback control law when the capacity increases, and the control portion decreases the control gain of the feedback control law when the capacity decreases.

14. A brake control method comprising:
determining whether there is a fluctuation in open/closed states of actuation of a plurality of retention valves provided for restraining slip of a plurality of wheels; and
controlling a common control valve which is provided on a channel of a working fluid upstream of the plurality of retention valves and which supplies the working fluid to a plurality of wheel cylinders that apply braking force individually to the wheels, so that a fluctuation in a pressure on a primary side of the plurality of retention valves is restrained, if it is determined that there is the fluctuation in the open/closed states of actuation of the plurality of retention valves.

15. The brake control method recited in claim 14, further comprising:
setting a command value based on the open/closed states of actuation of the plurality of retention valves so that the command value is proportional to a fluctuation in a capacity to which the working fluid from the common control valve is supplied to the plurality of retention valves, wherein
the common control valve is controlled based on the command value.

16. The brake control method according to claim 14, further comprising:
pressurizing the working fluid in accordance with an amount of brake operation performed by a driver;
delivering the pressurized working fluid to the plurality of wheel cylinders;
providing a power hydraulic pressure source in parallel with a manual hydraulic pressure source with respect to the plurality of wheel cylinders;
pressurizing the working fluid by supply of drive power independently of the amount of the brake operation performed by the driver; and
storing the pressurized working fluid in an accumulator, wherein
a supply of the working fluid from the accumulator to the plurality of wheel cylinders is controlled with the common control valve provided between the accumulator and the plurality of retention valves, and
the common control valve is controlled by a feedback control law to restrain fluctuation in pressure on a primary side of the retention valves, a control gain of the feedback control law is increased when the capacity increases and decreased when the capacity decreases.

* * * * *